United States Patent
Suganuma et al.

(10) Patent No.: US 7,054,672 B2
(45) Date of Patent: May 30, 2006

(54) INCOMING-CALL SIGNALING MELODY DATA TRANSMITTING APPARATUS, METHOD THEREFOR, AND SYSTEM THEREFOR

(75) Inventors: Kiwamu Suganuma, Santa Clara, CA (US); Noriyuki Okada, Sannyvale, CA (US)

(73) Assignee: Improvista Interactive Music, Inc., Campbell, CA (US)

( * ) Notice: Subject to any disclaimer, the term of this patent is extended or adjusted under 35 U.S.C. 154(b) by 322 days.

(21) Appl. No.: 10/308,213

(22) Filed: Dec. 2, 2002

(65) Prior Publication Data

US 2004/0106395 A1 Jun. 3, 2004

(51) Int. Cl.
*H01S 4/00* (2006.01)
(52) U.S. Cl. ..................................... 455/702
(58) Field of Classification Search .............. 455/567, 455/563, 418, 419, 420, 433
See application file for complete search history.

(56) References Cited

U.S. PATENT DOCUMENTS

| | | | |
|---|---|---|---|
| 2003/0012361 A1* | 1/2003 | Yoshimura | 379/373.01 |
| 2003/0160702 A1* | 8/2003 | Tanaka | 340/693.3 |
| 2003/0176206 A1* | 9/2003 | Taniguchi et al. | 455/567 |

FOREIGN PATENT DOCUMENTS

JP 2001-236066 A 8/2001

* cited by examiner

*Primary Examiner*—Creighton Smith
(74) *Attorney, Agent, or Firm*—Frishauf, Holtz, Goodman & Chick, P.C.

(57) ABSTRACT

An incoming-call signaling melody data transmitting apparatus of the present invention includes a remixing-method specification data reception section for receiving remixing-method specification data specifying a remixing method for a piece of specified music from the terminal device via a network, a remixing section for executing a remixing process for the piece of specified music in accordance with the remixing method specified in the received remixing-method specification data and for generating a piece of remixed music data, and a piece of remixed-music-data transmission section for transmitting the piece of music data generated by the remixing processing section to the terminal device that transmitted the remixing-method specification data.

11 Claims, 8 Drawing Sheets

FIG.6

| ID | USER ID | SONG ID | MELODY TONE ID | CHORD STYLE | BASS STYLE | DRUMS STYLE | TEMPO | DATE AND TIME |
|---|---|---|---|---|---|---|---|---|
| 00001 | 21273 | HOUND DOG | FLUTE | HARD ROCK | JAZZ | SKA | 110 | 02/10/17.. |
| 00002 | 65498 | AMERICAN PIE | MARIMBA | SYMPHONY | RAGGAE | JAZZ | 125 | .. |
| 00003 | 52584 | ONLY YOU | GUITAR | JAZZ | JAZZ | JAZZ | 88 | .. |
| 00004 | 13469 | MY WAY | FLUTE | TECHNO | PARAPARA | TRANS | 111 | 02/10/17.. |
| | | | | | | | | |

FIG.8

| ID | USER ID | SONG ID | PIECE-OF-MUSIC PURCHASED DATE AND TIME |
|---|---|---|---|
| 0001 | 01025 | MY WAY | 2002/10/17 14:15:45 |
| 0002 | 03993 | HOUND DOG | 2002/10/17... |
| 0003 | 29274 | AMERICAN PIE | ... |
| ... | | | |
| | | | |

FIG.9

| ID | REMIXED HISTORY ID | PUBLICIZATION START DATE | PUBLICIZATION TERMINATION DATE |
|---|---|---|---|
| 0001 | 00055 | 2002/11/3 | 2002/11/11 |
| 0002 | 15124 | 2002/03/17 | 2002/03/24 |
| 0003 | 22354 | 2002/05/24 | 2003/06/01 |
| ... | | | |
| | | | | ize melody data transmitting apparatus, a method therefor, and a system therefor.

2. Description of the Related Art

Recent cellular phones include those having a function capable of producing an incoming-call signaling melody sound as an incoming-call signaling sound instead of a simple sound such as beep sound to notify an incoming call to a user upon reception thereof. These cellular phones are grouped into a type in which incoming-call signaling melody sound data is preliminarily set in the cellular phone and a type in which incoming-call signaling melody sound data can be downloaded from an Internet site. Thereby, individual users can select an incoming-call signaling melody and set it as his/her own incoming-call signaling sound.

In more specific, in a service site through which an incoming-call signaling melody can be downloaded from an Internet site, incoming-call signaling melody sound data are preliminarily created and accumulated in a database thereof. To use the service site, a user selects a desired incoming-call signaling melody sound from a list of the preliminarily accumulated incoming-call signaling melody sounds and downloads it.

However, an incoming-call signaling melody sound downloadable by the user is selectable only from the incoming-call signaling melody sounds preliminarily accumulated in the database of the service site. As such, if a different user already downloaded an incoming-call signaling melody sound downloaded by the user, the incoming-call signaling melody sound would most likely be the same as that downloaded by the different user.

Some users are desirous of setting a desired or unique incoming-call signaling melody sound to a cellular phone of their own. That is, users are desirous of using a further original incoming-call signaling melody sound as his/her own incoming-call signaling sound.

Japanese Unexamined Patent Application Publication No. 2001-236066 describes a proposal for a cellular phone having a function of creating original incoming-call signaling melody sounds. According to the proposal, a user inputs musical score data for melody to the cellular phone, and then inputs style information and chord information thereto when generating accompaniment parts. Accompaniment data of a drum part, a base part, and a chord part that is stored in, for example, a ROM (read only memory), is selected according to the style information and the chord information that have been input. The accompaniment data of the plurality of selected parts are synthesized with the musical score data for melody, and a musical piece data is thereby generated. The generated musical piece data is then stored into a memory of the cellular phone, thereby enabling the musical piece data to be reproduced upon receipt of an incoming call.

However, music composition is not an easy task and requires the user to have a composing ability. As such, even with the cellular phone disclosed in Japanese Unexamined Patent Application Publication No. 2001-236066 being used, every user cannot compose an original incoming-call signaling melody sound. In addition, a significant workload is required to input composition data. Further, inclusion of many circuits for performing the processes described above into a cellular phone complicates the circuit configuration.

Accordingly, an object of the present invention is to provide an incoming-call signaling melody data transmitting system that enables a user to easily create an original incoming-call signaling melody sound for a cellular phone.

BRIEF SUMMARY OF THE INVENTION

An incoming-call signaling melody data transmitting apparatus of the present invention transmits incoming-call signaling melody data to a terminal device and comprises: a remixing-method specification data reception section for receiving remixing-method specification data specifying a remixing method for a piece of specified music from the terminal device via a network; a remixing section for executing a remixing process for the piece of specified music in accordance with the remixing method specified in the received remixing-method specification data and for generating remixed piece of music data; and a piece of remixed-music-data transmission section for transmitting the piece of music data generated by the remixing section to the terminal device that transmitted the remixing-method specification data.

The above and other objects, features, and advantages of the invention will become more clearly understood from the following description referring to the accompanying drawings.

BRIEF DESCRIPTION OF THE DRAWINGS

FIG. 6 is a diagram showing a data format of a remixing database according to the embodiment.

FIG. 8 is a diagram showing a data format of a My Library database according to the embodiment.

FIG. 9 is a diagram showing an example data format of a public database 3a according to the embodiment.

DESCRIPTION OF THE PREFERRED EMBODIMENT

Hereinbelow, an embodiment of the present invention will be described using the drawings.

Figure 1:
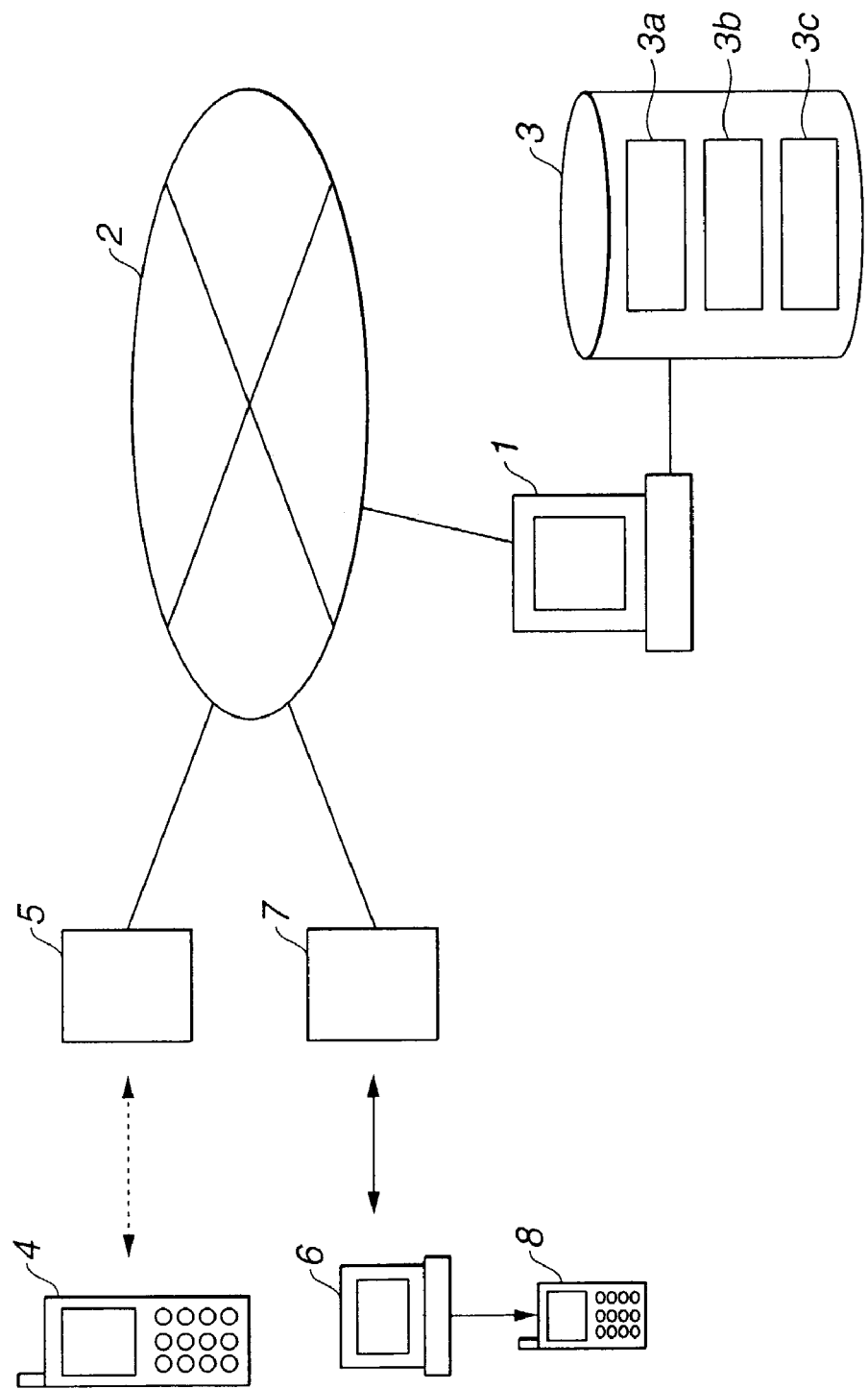
FIG. 1 is a configuration diagram showing the configuration of an incoming-call signaling melody data transmitting system of an embodiment according to the present invention.

FIG. 1 is a configuration diagram showing the configuration of an incoming-call signaling melody data transmitting system of the embodiment. Referring to FIG. 1, a web server unit (which hereinbelow will simply be referred to as a "server") 1 provided as an incoming-call signaling melody data transmitting apparatus is connected to an Internet 2, which is used as a communication network. The server 1 working as a center unit includes a data reception section (not shown in FIG. 1) for receiving data from the Internet 2, and a data transmission section (not shown in FIG. 1) for transmitting data via the Internet 2. The server 1 is connected to a memory unit 3 that stores various types of accumulated data and that includes a public database 3*a*, a remixing database 3*b*, and a My Library database 3*c*. The public database 3*a* stores incoming-call signaling melody data that have been created by users and that are publicized downloadable also by users other than the users who have created the melody data. The remix database 3*b* stores, for example, various types of style data required for executing a remix process. The My Library database 3*c* stores data of incoming-call signaling melodies downloaded by users.

A cellular phone 4 as a terminal device can be connected to the Internet 2 via a communication station (not shown) of a communication carrier transmitting cellular phone services and a server unit 5. Similarly, a personal computer (which hereinbelow will be referred to as a "PC") 6 can be connected to the Internet 2 via a server unit 7 of an Internet service provider. Consequently, the cellular phone 4 and the PC 6 can be connected to the site of the server 1 via the Internet 2 to receive the transmitted incoming-call signaling melody data from the server 1, as described below. In addition, a cellular phone 8 can be connected to the PC 6, whereby incoming-call signaling melody data downloaded by the PC 6 can be transferred to the cellular phone 8 and can be stored in a memory (not shown) of the cellular phone 8.

First, referring to screens operated by a user, a processing flow will be described in which original incoming-call signaling melody sound data is generated using the incoming-call signaling melody data transmitting system of the present embodiment and is thereby downloaded into either the cellular phone 4 or the PC 6.

Figure 2:
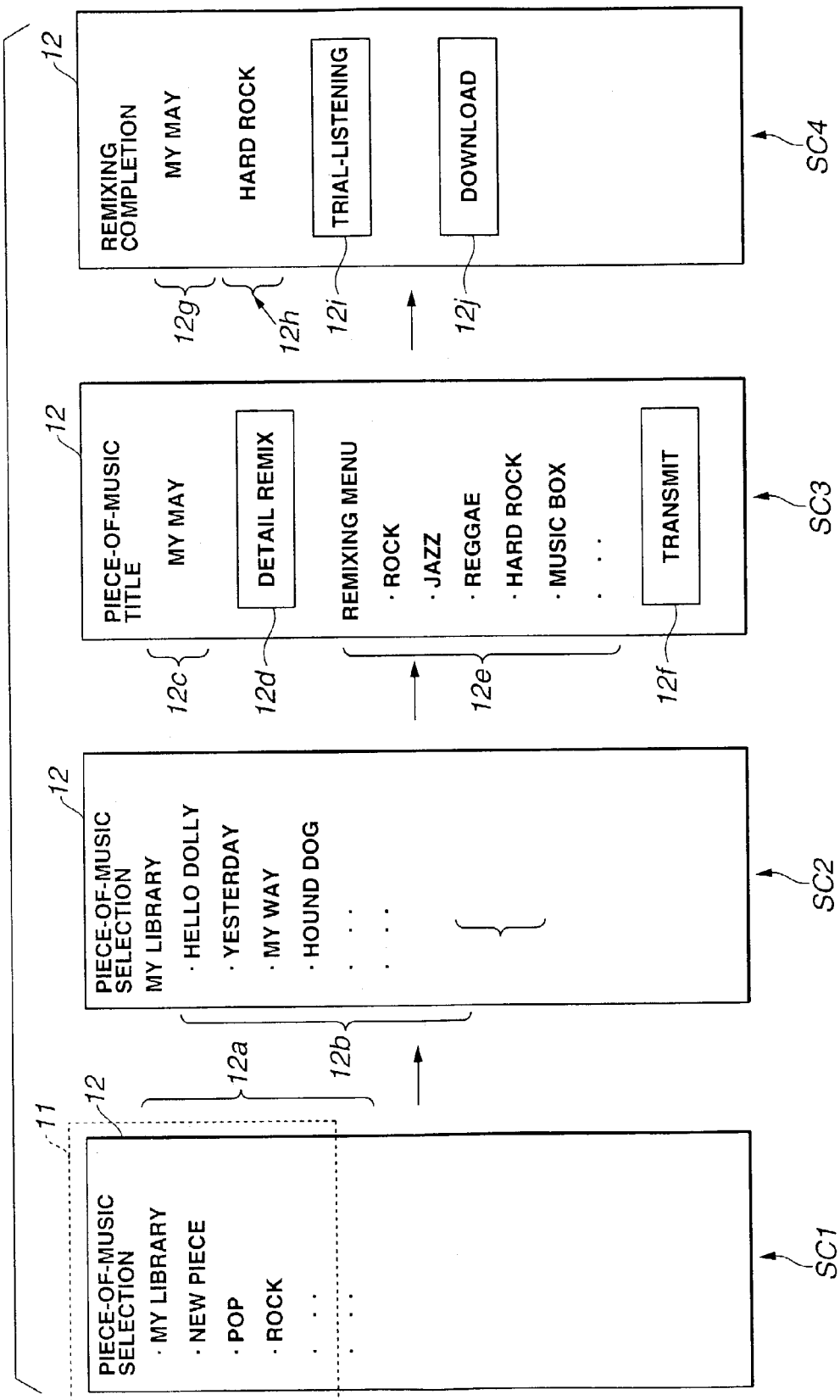
FIG. 2 is a diagram showing screen transitions in the event of downloading incoming-call signaling melody data according to the embodiment.

FIG. 2 is a diagram showing screen transitions in an event that a user accesses the server 1 and downloads incoming-call signaling melody data therefrom in accordance with screen instructions displayed on the display screen of the cellular phone 4. Also when downloading the incoming-call signaling melody data into the PC 6, a user can download it in accordance with substantially the same screens as those described hereunder.

As types broadly classified, two methods are usable for the user to download an incoming-call signaling melody into the cellular phone of the user. In one of the methods, by selection of only a style of a selected melody, that is, a genre thereof, the incoming-call signaling melody can be generated, and data of the generated incoming-call signaling melody can be downloaded (this technique hereinbelow will be referred to as a "simple remixing method"). In the other technique, by specifying tones, styles and the like of a melody, a chord, a base, and drums, and the like for the piece of selected music, the incoming-call signaling melody can be generated, and data of the generated incoming-call signaling melody can be downloaded (this method hereinbelow will be referred to as a "detail remixing method"). The user accesses a predetermined site of the server 1 through the cellular phone 4, and selects either of the simple remixing method or the detail remixing method. The word "remixing" means to arrange a piece of music corresponding to the specified style.

FIG. 2 shows screen transitions in the event that the user downloads incoming-call signaling melody data according to the simple remixing method. Description given below refers to an example in which the incoming-call signaling melody data is downloaded into the cellular phone 4. When the data is downloaded into the PC 6, although the types of the display screens are dissimilar, the display contents and operation steps are substantially the same.

Referring to FIG. 2, numeral 11 denotes a display frame of a liquid crystal display device of the cellular phone 4, and numeral 12 denotes a screen frame generated according to screen data transmitted from the server 1. The user operates function buttons (not shown) of the cellular phone 4, such as arrow buttons provided to move a cursor on the screen, and scrolls through the display frame 11 within the screen frame 12, thereby enabling the screen data to be displayed.

First, the user accesses a predetermined site of the server 1 from the cellular phone 4, causes the display device of the cellular phone 4 to display a screen SC1 as shown in FIG. 2, and then selects a piece of music (song) desired as an incoming-call signaling melody for the cellular phone of the user. Specifically, a category display section 12*a* of the screen SC1 displays a category list of "My Library", "New Piece", "Pop", "Rock", and so forth, in which the individual character sections function as selecting buttons. In the screen SC1, the "My Library" section functions as a button for displaying pieces of music previously registered by the user. When the "My Library" button on the screen has been selected by operating the buttons and thereby moving the cursor, the screen display of the cellular phone 4 shifts from the screen SC1 to a screen SC2. When "New Piece of Music" has been selected, a list of new pieces of music is displayed; when "Pop" has been selected, a list of pieces of popular music is displayed; and when "Rock" has been selected, a list of pieces of rock music is displayed.

When the user has selected, for example, the "My Library" button, the screen SC2 is displayed, and titles of pieces of music registered in the memory unit 3 as "My Library" data are displayed in a list display section 12*b* in the form of a list. Pieces of music previously used by the user as incoming-call signaling melodies are registered in "My Library". As such, when the user desires to use same one of the registered pieces of music for generating an incoming-call signaling melody having a different style, the user can select the music from those registered in "My Library". For example, when a "My Way" piece-of-music button has been selected from the "My Library" list on the screen SC2, the screen display shifts to a screen SC3.

The screen SC3 includes a selected piece-of-music display section 12*c* for displaying a selected piece of music title, a detail remixing button 12*d* for causing screen transition to a screen for performing detail remixing, a style specification section 12*e* for use in the simple remixing, and a transmission button 12*f* for transmission of a selected piece of music. The style specification section 12*e* displays styles such as "Rock", "Jazz", and "Reggae" in the form of a list, so that the user can select one of them.

When one of the styles displayed in the style specification section 12*e* of the screen SC3 is selected and specified, and the transmission button 12*f* is selected, piece-of-music title data representing the piece-of-music title selected by the user and style specification data representing the style selected and specified by the user are transmitted to the server 1. The style specification data are used as remixing-method specification data that specify a remixing method that will be executed by the server 1. In response to the piece-of-music title data and the style specification data that were specified on the screen SC3 and that have been transmitted from the cellular phone 4, the server 1 executes the remixing. Upon termination of the remixing, the server 1 generates screen data for a screen SC4 and transmits it. Consequently, the screen display of the cellular phone 4 shifts from the screen SC3 to the screen SC4. On the screen SC4, the selected music title is displayed in a selected piece-of-music display section 12g, and a selected style is displayed in a selected-style display section 12h. In addition, the screen SC4 consists of a trial-listening button 12i for listening trially to the piece of music remixed using the selected style, and a download button 12j for downloading the generated remixed piece of music.

When the user has selected the trial-listening button 12i, since trial-listening data of the remixed piece of music "My Way" is transmitted from the server 1, the user can listen trially to it. As a result of the trial-listening, when the user determines the remix not to have been performed as desired, the user operates the display screen to return to the screen SC3 and performs style selection again. As a result of the trial-listening, when the user is satisfied with the remixed piece of music, the user then selects the download button 12j. As a result, the incoming-call signaling melody data is transmitted from the server 1, and data of the remixed piece of music is stored into the cellular phone 4. When the data of the remixed piece of music has been downloaded, the server 1 executes an accounting process for the user.

Figure 3:
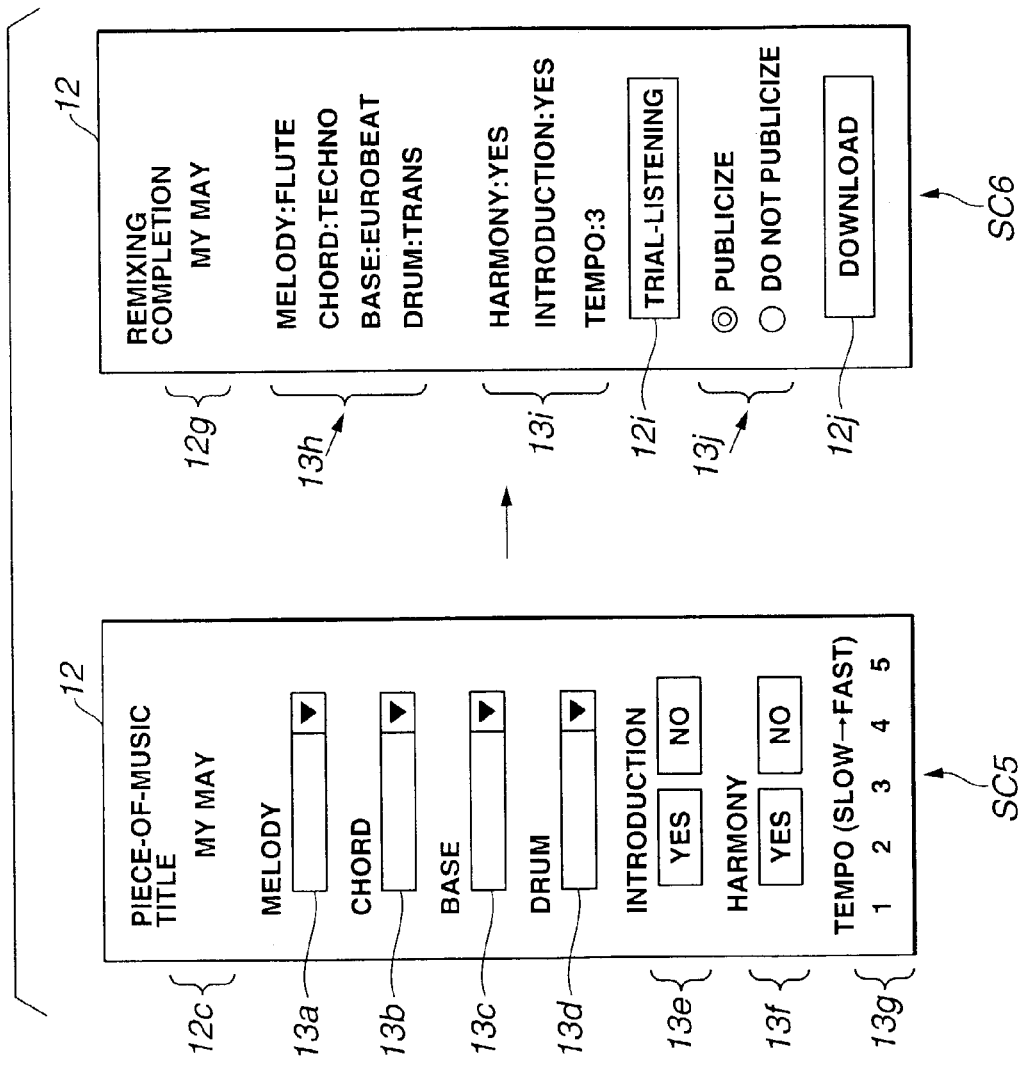
FIG. 3 is a diagram showing screen transition in the event of downloading incoming-call signaling melody data by using a detail remixing method according to the embodiment.

Hereinbelow, referring to FIG. 3, the event of downloading the incoming-call signaling melody data by using the detail remixing method will be described. When the detail remixing button 12d on the screen SC3 shown in FIG. 2 has been selected, the server 1 generates screen data for the screen SC5 and transmits it to the cellular phone 4 in response to the selection. As a consequence, the display screen of the cellular phone 4 shifts to the screen SC5. The screen SC5 includes a selected piece-of-music display section 12c for displaying a piece of selected music, a tone specification section 13a for specification of a tone of a melody part for the piece of selected music, a chord-part style specification section 13b for specification of a style of a chord part for the piece of music, a base-part style specification section 13c for specification of a style of a base part for the piece of music, a drum-part style specification section 13d for specification of a style of a drum part for the piece of music, an introduction specification section 13e for specification of whether or not to add an introduction to the piece of music, a harmony specification section 13f for specification of whether or not to add "harmony" to a melody of the piece of music, and a tempo specification section 13g for specification of a tempo for the piece of music.

Using the tone specification section 13a, the user can select a desired tone from specifiable tones listed in the form of a pulldown menu. The tone specifiable for the melody part is, for example, "Flute", "Guitar", or "Piano". Using each of the chord-part style specification section 13b, the base-part style specification section 13c, and the drum-part style specification section 13d, the user can select a desired style from specifiable styles listed in the form of a pulldown menu. The specifiable style is, for example, "Rock", "R & B" (rhythm and blues), "Hard Rock", "Reggae", or "Jazz".

The introduction specification section 13e includes portions for specification of whether or not to add an introduction part to the outset of the piece of music. Using these portions, when the user has selected "Yes" by moving the cursor, the introduction part is added to the piece of selected music; whereas, when the user has selected "No", no introduction part is added thereto.

The harmony specification section 13f includes portions for specification of whether or not to add "harmony" to the piece of music. Using these portions, when the user has selected "Yes" by moving the cursor on the display screen of the cellular phone 4, the "harmony" is added to the melody of the piece of music; whereas, when the user has selected "No", the "harmony" is not added thereto.

The tempo specification section 13g displays numerals for specification of the tempo of the piece of music. In the illustrated case, the user can discretely specify the tempo by selecting one of the five numerals "1" to "5", in which "1" represents the slowest tempo and "5" represents the fastest tempo. The user moves the cursor to a desired numeral to specify the desired tempo. The tempo specification section 13g may be provided to enable the tempo to directly be specified. For example, the screen SC5 may include a BPM input section provided to input a BPM (beat per minute) value, thereby enabling a value such as "111", to directly be input.

When a transmission button (not shown) on the screen SC5 has been depressed, data such as the contents of the individual parts selected and input by the user on the screen SC5 are transmitted to the server 1. The server 1 then executes the remixing process according to the contents specified on the screen SC5, generates screen data for a screen SC6 upon termination of the remixing process, and transmits the data to the cellular phone 4. As a result, the display screen of the cellular phone 4 shifts from the screen SC5 to the screen SC6. On the screen SC6, the piece of selected music is displayed on the selected piece-of-music display section 12g, and the contents of the individually selected parts are displayed in a first specification-content display section 13h. In the illustrated case, the selected piece-of-music display section 12g displays that "My Way" has been specified, and the first specification-content display section 13h displays that "Flute" has been specified for the melody, "Techno" has been specified for the chord, "Eurobeat" has been specified for the base, and "Trans" has been specified for the drums.

In addition, the screen SC6 displays a second specification-content display section 13i that displays specification contents for the introduction, the harmony, and the tempo. In the illustrated case, the second specification-content display section 13i displays the contents that "Yes" has been specified for the introduction, "Yes" has been specified for the harmony, and "3", has been specified for the tempo. Further, the screen SC6 displays the trial-listening button 12i like as the screen SC4 in FIG. 2 does. For the piece of music displayed on the selected piece-of-music display section 12g, the user can trially listen to an incoming-call signaling melody generated by remixing according to the specification contents displayed in the first and second specification-content display sections 13h and 13j. Specifically, the trial-listening button 12i is selected to cause data of the trial-listening dedicated remixed piece of music generated by the server 1 to be transmitted and output from a speaker provided in the cellular phone 4, thereby enabling the trial-listening to be performed. As a result of the trial-listening, when the user determines the remixing not to have been performed as desired, the user operates the display screen to return to the screen SC5 and again selects styles and the like.

In addition, the screen SC6 displays a checkbox-type publicization/nonpublicization-selection display section 13j for specification of whether or not to publicize the incoming-call signaling melody, to which the user has listened trially, on a homepage publicized by the server 1. The user can select either "Publicize" or "Do not publicize". FIG. 3 shows a case where "Publicize" has been selected.

Further, the screen SC6 includes a download button 12*j* provided for use when downloading the generated remixed piece of music.

As such, when the user is satisfied with the result of trial-listening, the user can store the remixed piece of music into the cellular phone by selecting the download button 12*j*. Concurrently, the user can specify whether to publicize the remixed piece of music on a homepage.

Figure 4:
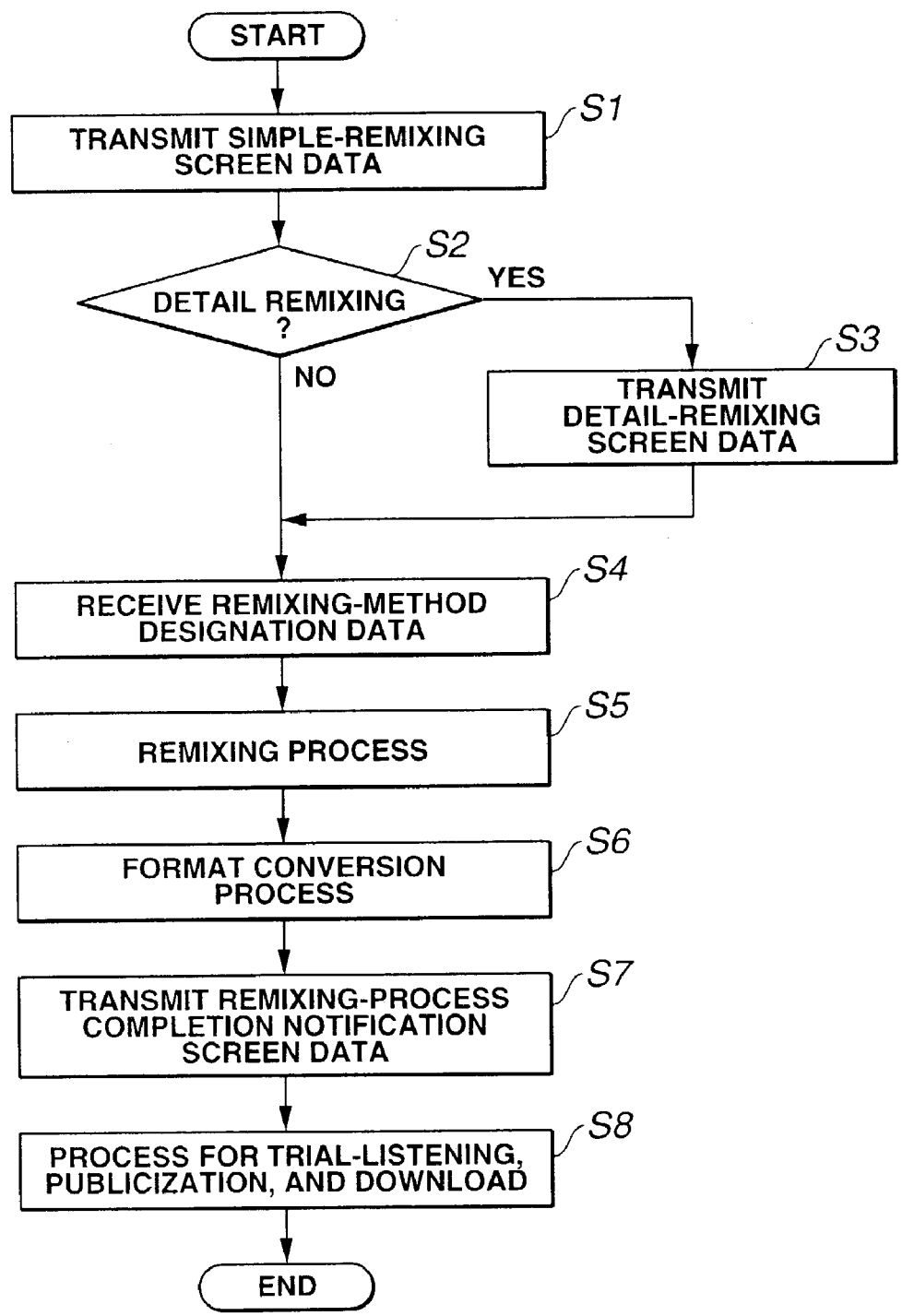
FIG. 4 is a flowchart for explaining processes of a server according to the embodiment.

FIG. 4 is a flowchart for explaining the flow of processes of the server, which works as the center unit, with respect to the flow of the screens described above.

First, when the user accesses a predetermined URL (uniform resource locator) site of the server 1 via the cellular phone 4, the server 1 transmits a piece-of-music selection screen data to the cellular phone 4. As the piece-of-music selection screen data, data for the piece-of-music selection screen SC1 is first transmitted, and data for the screen SC2 is then transmitted according to selections performed by the user on the screen SC1.

When a piece of music is selected by the cellular phone 4 of the user, screen data for the screen SC3 for the simple remixing is transmitted from the server 1 to the cellular phone 4 (Step ("Step" hereinbelow will shortly be indicated as "S") 1). When the detail remixing button 12*d* on the screen SC3 has been depressed, server 1 transmits screen data for the screen SC5 for the detail remixing to the cellular phone 4 (S3).

The screen data for the screen SC3 includes data for displaying the style specification section 12*e*, which is used by the user to specify the style, on the display screen of the cellular phone 4. The screen data for the screen SC5 includes data for displaying the tone specification section 13*a*, which is used by the user to specify the tone, and for displaying the part style specification sections 13*b*, 13*c*, and 13*d*, which are used by the user to specify the individual parts, on the display screen of the cellular phone 4. In this manner, the user specifies the detailed contents of the specifications for the remixing method according to the instructions displayed on the individual screens SC3 and SC5, and the cellular phone 4 transmits the piece of specified music and data for the remixing process method. Accordingly, the server 1 receives the piece-of-music title data and the remixing-method specification data (S4).

According to the received remixing-process-method specification data, the server 1 executes the remixing process for the piece of music specified by the user (S5). Upon termination of the remixing process, the server 1 executes a format conversion process for the data corresponding to the mode of the cellular phone of the user (S6). Upon termination of the format conversion process, data for the screens SC4 and SC6 are transmitted (S7). According to displays appearing on the screens SC4 and SC6, the user performs specifications for the trial-listening, the publicization, and the download. Then, the server 1 executes processing for the trial-listening, the publicization, and the download according to the specifications for the trial-listening and the others (S8). In the processing of S8, regarding the user-created remixing-processed piece of music data, for example, trial listening dedicated data is transmitted, the piece of music data are stored into a predetermined memory region of the memory unit 3 for performing the publicization processing, and title data is added to a publicization list of piece of music. In addition, if the user specifications include a specification for the download, the piece of created music data is transmitted to the cellular phone 4.

Figure 5:
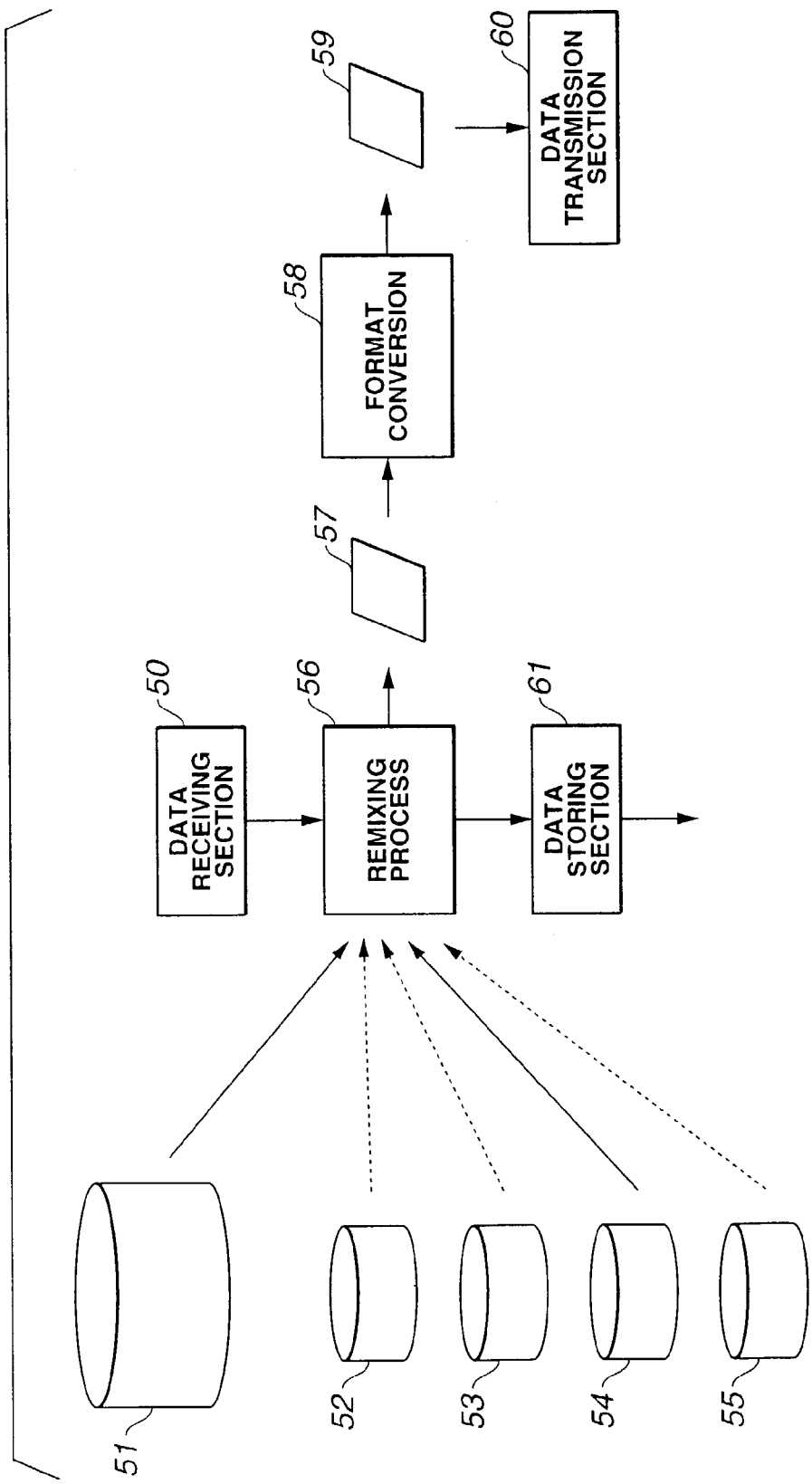
FIG. 5 is a diagram for explaining a remix process and a format conversion of remixed melody data according to the embodiment.

FIG. 5 is a diagram for explaining the remixing process of S5 and the format conversion that are shown in FIG. 4. The remix database 3*b* of the memory unit 3 includes melody data 51, tone data 52, chord data 53, base data 54, and drum data 55, as shown in FIG. 5. The user selects a piece of music and specifies the remixing-process method. Then, piece-of-music title data and remixing-process-method specification data are transmitted from the cellular phone 4, and are received by a data reception section 50 of the server 1 via the Internet 2. Accordingly, in a remixing process corresponding to S5 shown in FIG. 4, a piece of music data is generated according to melody data, tone data, and individual style data of the piece of music that are stored in the remixing database 3*b* of the memory unit 3. A remixing process 56 will be described below in detail. A format conversion process 58 for converting a data format to be processable by the cellular phone 4 of the user is executed for the piece of music data, namely, remixing-processed data 57, generated by the remixing process. The format conversion process 58 corresponds to S6 shown in FIG. 4. Format-converted data 59, which is data converted for the format, is transmitted from a data transmission section 60 of the server 1 to the cellular phone 4 via the Internet 2 as either trial-listening dedicated data or download dedicated data.

In addition, with respect to the piece of music for which the remixing has been processed in the remixing process 56, a remixing-data storing section 61 is provided to store the remixing-processed content data into the public database 3*a* and the remix database 3*b* of the memory unit 3. In specific, according to remixing-process content data stored in the public database 3*a*, the server 1 can perform remixing in the remixing process 56 for a piece of music specified by a cellular phone or the like of another user. In this case, in response to a download instruction specified by the cellular phone or the like of the another user, the server 1 can transmit the remixed and generated piece of music data to the cellular phone or the like of the another user.

After incoming-call signaling melody sound data generated according to the simple remixing method and incoming-call signaling melody sound data generated according to the detail remixing method have been downloaded by the user, data representing piece of selected music, tone, chord, base, and drums, "Yes"/"No" specified for the harmony, "Yes"/"No" specified for the introduction, and the tempo are stored as remixed history data into the remixing database 3*b*.

FIG. 6 is a diagram showing an example data format of the remixing database 3*b*.

One record is created in units of a piece of remixed music. Each record includes various data. The various data represent an identification code (ID) used as a remixed-history identification code, a user identification code (user ID), a piece-of-music identification code (song ID), a melody-tone identification code (tone ID), a chord style, a base style, a drum style, a tempo, and the date and time when the remixing process was performed.

When the incoming-call signaling melody has been generated by the detail remixing method, data representing the contents selected on the screen SC5 are registered into the remix database 3*b*. For example, for the ID "00004" shown in FIG. 6, the data registered into the remixing database 3*b* represent "Flute" for the tone ID, "Techno" for the chord style, "Eurobeat" for the base style, "Trans" for the drum style, and "111" corresponding to tempo "3" for the tempo.

When the incoming-call signaling melody has been generated by the simple remixing method, data of a tone ID, a chord style, a base style, a drum style, and a tempo that have been predetermined corresponding to styles selected by the user from those in the style specification section 12*e* of the screen SC3 are registered into the remixing database 3*b*. For example, when "Jazz" has been selected for the style, each data is registered as follows: The melody is registered with a tone predetermined; same style set as "Jazz" is registered for chord, base, and drums; and a tempo is registered with a predetermined tempo.

In the present case, although the incoming-call signaling melody data generated according to the simple remixing method and the incoming-call signaling melody data generated according to the detail remixing method are registered into a single database, namely, the remixing database 3b, these data may separately be registered into two databases.

Figure 7:
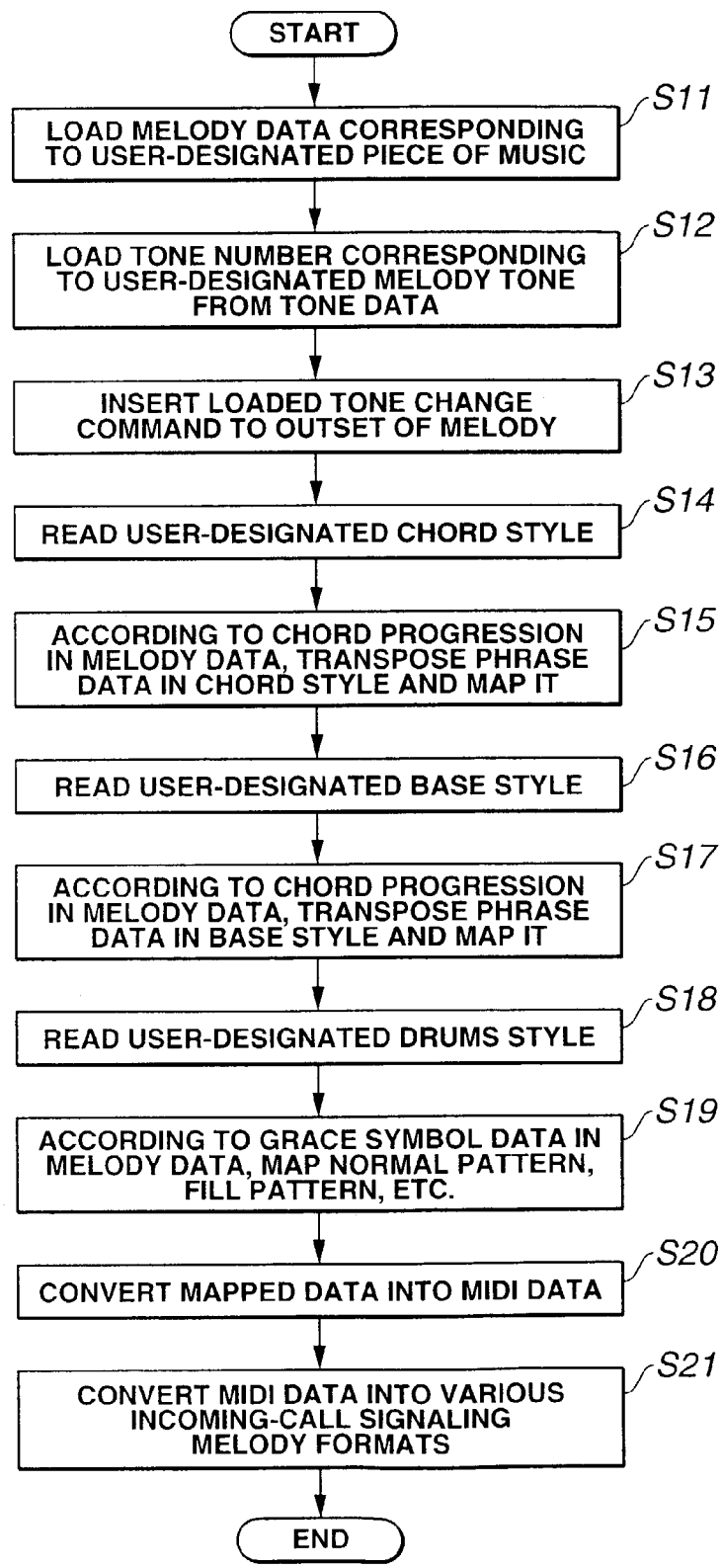
FIG. 7 is a flowchart showing the flow of the remix process according to the embodiment.

Hereinbelow, the contents of the remixing process 56 shown in FIG. 5 will be described using FIG. 7. FIG. 7 is a flowchart showing the flow of the remixing process. The remixing process is executed using a remixing-engine software program stored in the server 1. In response to a user specification for either the simple remixing process or the detail remixing process, the server 1 commands a central processing unit (which hereinbelow will be referred to as a "CPU") to execute the remixing-engine software program.

After the remix-engine software program has started, the CPU loads melody data corresponding to a user-specified piece of music from the melody database 51 of the memory unit 3 (S11). The melody data includes MIDI data of the melody, chord progression data, and grace data. The MIDI data of the melody is data representing the melody in an ordinary MIDI data format. The chord progression data is data represented such that chord constituent notes (for example, C, E, G, and bB, for C7) and chord-change-causing measure and beat data are enumerated. The grace data is data specifying, for example, normal, fill-in, and break patterns in units of a measure.

In the present case, the melody data are thus represented in the above-described format. However, the melody data may be represented in a different format.

A tone number corresponding to a melody tone specified by the user is loaded from the tone database 52 (S12). The tone data is data representing GM (general midi) tone numbers (1 to 128). A tone change command for the loaded tone is inserted to the outset of the melody (S13).

A chord style specified by the user is read from the chord-style database 53 (S14).

The style data includes data representing a specific-measure playing pattern (phrase data), a chord progression that is associated with the pattern, and grace information associated with the pattern. The data of the specific-measure playing pattern represents playing data for specific measures (ordinary, one to four measures) in the MIDI format. The chord progression data to be associated with the pattern represents chord progression data used as basic data. The chord progression data is represented in the same data format as the chord progression data in the melody data. The grace information data to be associated with the pattern represents grace information to be associated with each pattern. Practical examples of the data are data representing, for example, normal, fill, and break and the like.

The style data may be represented in a format different from the style format described above.

Subsequently, phrase data in the chord style are transposed and mapped in accordance with the chord progression in the melody data (S15). Then, a base style specified by the user is read from the base-style database 54 (S16). The phrase data in the base style are then transposed and mapped in accordance with the chord progression in the melody data (S17). Subsequently, a drum style specified by the user is read from the drum-style database 55 (S18). Then, for example, a normal pattern and a fill pattern are mapped in accordance with grace symbol data in the melody data (S19). The mapped data are then converted into MIDI data (S20). Subsequently, in the format conversion portion 58, the data 57 thus converted are converted from the MIDI data into a discreet incoming-call signaling melody format (S21). Thereby, data 59 formatted corresponding to a discrete cellular phone is generated.

In the manner described above, the remix process 56 is executed, the piece of music data 57 remixed and generated is converted by the format conversion processing 58 into the format corresponding to the model of the discrete cellular phone, and the converted piece of music data 59 is then downloaded into the cellular phone of the user.

Hereinbelow, the structure of individual data stored in the memory unit 3 will be described.

User-generated incoming-call signaling melody data are stored into regions predetermined for discrete users in the My Library database 3c of the server 1. FIG. 8 is a diagram showing a data format of the My Library database.

As shown in FIG. 8, data regarding pieces of music purchased by users are stored into the My Library database. Each data record includes a data identification code (ID), a user identification code (user ID), a piece-of-music identification code (song ID), and data of a piece-of-music purchased date and time.

As such, when creating data of pieces of music purchased by a user and displaying a list of the pieces of music on the cellular phone 4 of the user, the server 1 uses a corresponding user ID as a key to search for song IDs registered in a "My Song Library Table". Consequently, the searched result can be displayed in the form of a list on the list display section 12b of the screen SC3 shown in FIG. 2.

In addition, when the publicization of a remixed incoming-call signaling melody sound has been selected, an identification code (ID code) of remixed history data is stored into the public database 3a.

FIG. 9 is a diagram showing an example data format of the public database 3a. As shown in FIG. 9, one record is created in units of a piece of publicization-specified music. Each record includes various data. The various data represent an identification code (ID), a remixed history identification code (remix history ID), a publicization start date, and a publicization termination date. The remixed-history identification code is the identification code (ID) shown in FIG. 6.

The server 1 is capable of retrieving data stored in the public database 3a in response to a retrieval request issued from the cellular phone of the user. Consequently, for example, the user can search for remixed incoming-call signaling melodies publicized in units of a registered user and can download an incoming-call signaling melody generated by a different person that suits a taste of the user.

Having described the preferred embodiment of the invention referring to the accompanying drawing, it should be understood that the present invention is not limited to the precise embodiment and various changes and modifications thereof could be made by one skilled in the art without departing from the spirit or scope of the invention as defined in the appended claims.

What is claimed is:

1. An incoming-call signaling melody data transmitting apparatus for transmitting an incoming-call signaling melody data to a terminal device, said apparatus comprising:
 a data reception section for receiving, from the terminal device via a network, remixing-method specification data which specifies a remixing method for a specified piece of music, and which comprises style specification data which specifies a style for remixing the specified piece of music;

a remixing section for executing a remixing process for the specified piece of music in accordance with the remixing method specified by the received remixing-method specification data so as to generate a piece of remixed music data, said remixing process comprising executing an arrangement process corresponding to the style specified by the style specification data;

a transmission section for transmitting the piece of remixed music data generated by the remixing section to the terminal device;

a screen-data transmission section for transmitting screen data to the terminal device, said screen data comprising data for causing a display screen of the terminal device to display a style specification portion for specifying the style for remixing the specified piece of music; and a remixing-data storing section for storing in a memory unit remixing-process content data related to the remixing process of the piece of remixed music data, such that the piece of remixed music data generated by using the remixing-process content data stored in the memory unit is available for transmission to another terminal device.

2. An incoming-call signaling melody data transmitting apparatus for transmitting an incoming-call signaling melody data to a terminal device, said apparatus comprising:

a data reception section for receiving, from the terminal device via a network, remixing-method specification data which specifies a remixing method for a specified piece of music, and which comprises tone-and-part-style specification data that specifies a tone of a melody and styles of individual parts of a chord, a base, and drums for remixing the specified piece of music;

a remixing section for executing a remixing process for the specified piece of music in accordance with the remixing method specified by the received remixing-method specification data so as to generate a piece of remixed music data, said remixing process comprising executing an arrangement process corresponding to the tone and the styles of the individual parts that are specified by the tone-and-part-style specification data;

a transmission section for transmitting the piece of remixed music data generated by the remixing section to the terminal device that transmitted the remixing-method specification data;

a screen data transmission section for transmitting screen data to the terminal device, said screen data comprising data for causing a display screen of the terminal device to display a tone specification portion for specifying the tone of the melody and a part-style specification section for specifying the styles of the individual parts: and a remixing-data storing section for storing in a memory unit remixing-process content data related to the remixing process of the piece of remixed music data, such that the piece of remixed music data generated by using the remixing-process content data stored in the memory unit is available for transmission to another terminal device.

3. The incoming-call signaling melody data transmitting apparatus according to claim 2, wherein the screen data further comprises data for causing the display screen of the terminal device to display an introduction specification portion for specifying whether to add an introduction to the specified piece of music.

4. The incoming-call signaling melody data transmitting apparatus according to claim 2, wherein the screen data further comprises data for causing the display screen of the terminal device to display a harmony specification portion for specifying whether to add harmony to the melody of the specified piece of music.

5. The incoming-call signaling melody data transmitting apparatus according to claim 2, wherein the screen data further comprises data for causing the display screen of the terminal device to display a tempo specification portion for specifying a tempo of the specified piece of music.

6. An incoming-call signaling melody data transmitting method for transmitting an incoming-call signaling melody data from a center unit to a terminal device connected to the center unit via a network, said method comprising:

receiving at the center unit, from the terminal device via the network, remixing-method specification data which specifies a remixing method for a specified piece of music, and which comprises style specification data which specifies a style for remixing the specified piece of music;

executing, by the center unit, a remixing process for the specified piece of music in accordance with the remixing method specified by the received remixing-method specification data so as to generate a piece of remixed music data, said remixing process comprising executing an arrangement process corresponding to the style specified by the style specification data; and transmitting from the center unit to the terminal device the piece of remixed music data;

transmitting screen data to the terminal device, said screen data comprising data for causing a display screen of the terminal device to display a style specification portion for specifying the style for remixing the specified piece of music; and storing, in a memory unit, remixing process content data related to the remixing process of the piece of remixed music data, such that the piece of remixed music data generated by using the remixing-process content data stored in the memory unit is available for transmission to another terminal device.

7. An incoming-call signaling melody data transmitting method for transmitting an incoming-call signaling melody data from a center unit to a terminal device connected to the center unit via a network, said method comprising:

receiving at the center unit, from the terminal device via the network, remixing-method specification data which specifies a remixing method for a specified piece of music, and which comprises tone-and-part-style specification data that specify a tone of a melody and styles of individual parts of a chord, a base, and drums for remixing the specified piece of music;

executing, by the center unit, a remixing process for the specified piece of music in accordance with the remixing method specified by the received remixing-method specification data so as to generate a piece of remixed music data, said remixing process comprising an arrangement process corresponding to the tone and the styles of the individual parts that are specified by the tone-and-part-style specification data;

transmitting from the center unit to the terminal device the piece of remixed music data;

transmitting screen data to the terminal device, said screen data comprising data for causing a display screen of the terminal device to display a tone specification portion for specifying the tone of the melody and a part-style specification section for specifying the styles of the individual parts; and storing, in a memory unit, remixing-process content data related to the remixing process of the piece of remixed music data, such that the piece of remixed music data generated by using the remixing-process content data stored in the memory unit is available for transmission to another terminal device.

8. The incoming-call signaling melody data transmitting method according to claim 7, wherein the screen data further comprises data for causing the display screen of the terminal device to display an introduction specification portion for specifying whether to add an introduction to the specified piece of music.

9. The incoming-call signaling melody data transmitting method according to claim 7, wherein the screen data further comprises data for causing the display screen of the terminal device to display a harmony specification portion for specifying whether to add harmony to the melody of the specified piece of music.

10. The incoming-call signaling melody data transmitting method according to claim 7, wherein the screen data further comprises data for causing the display screen of the terminal device to display a tempo specification portion for specifying a tempo of the specified piece of music.

11. An incoming-call signaling melody data transmitting system comprising:
a terminal device; and
a center unit for transmitting incoming-call signaling melody data to the terminal device;
wherein the center unit comprises:
a data reception section for receiving, from the terminal device via a networks, remixing-method specification data which specifies a remixing method for a specified piece of music;
a remixing section for executing a remixing process for the specified piece of music in accordance with the remixing method specified by the received remixing-method specification data so as to generate a piece of remixed music data;
a transmission section for transmitting the piece of remixed music data generated by the remixing section to the terminal device; and
a remixing-data storing section for storing in a memory unit remixing-process content data related to the remixing process of the piece of remixed music data, such that the piece of remixed music data generated by using the remixing-process content data stored in the memory unit is available for transmission to another terminal device.

* * * * *